United States Patent
He et al.

(10) Patent No.: US 11,684,908 B2
(45) Date of Patent: Jun. 27, 2023

(54) CERIUM MANGANESE CATALYST, PREPARATION METHOD THEREFOR AND USE THEREOF

(71) Applicant: RESEARCH CENTER FOR ECO-ENVIRONMENTAL SCIENCES, CHINESE ACADEMY OF SCIENCES, Haidian District Beijing (CN)

(72) Inventors: Hong He, Haidian District Beijing (CN); Jinzhu Ma, Haidian District Beijing (CN); Xiaotong Li, Haidian District Beijing (CN); Changbin Zhang, Haidian District Beijing (CN)

(73) Assignee: RESEARCH CENTER FOR ECO-ENVIRONMENTAL SCIENCES, CHINESE ACADEMY OF SCIENCES, Beijing (CN)

( * ) Notice: Subject to any disclaimer, the term of this patent is extended or adjusted under 35 U.S.C. 154(b) by 256 days.

(21) Appl. No.: 16/980,635

(22) PCT Filed: Jan. 16, 2019

(86) PCT No.: PCT/CN2019/071904
§ 371 (c)(1),
(2) Date: Sep. 14, 2020

(87) PCT Pub. No.: WO2019/179225
PCT Pub. Date: Sep. 26, 2019

(65) Prior Publication Data
US 2021/0016255 A1 Jan. 21, 2021

(30) Foreign Application Priority Data
Mar. 21, 2018 (CN) .......................... 201810234417.2

(51) Int. Cl.
*B01J 23/10* (2006.01)
*B01J 23/34* (2006.01)
(Continued)

(52) U.S. Cl.
CPC ......... *B01J 23/6562* (2013.01); *B01J 35/002* (2013.01); *B01J 37/031* (2013.01); *B01J 37/06* (2013.01)

(58) Field of Classification Search
CPC ........ B01J 23/10; B01J 23/34; B01J 23/6562; B01J 35/002; B01J 37/031; B01J 37/06
(Continued)

(56) References Cited

U.S. PATENT DOCUMENTS 8,932,981 B2 * 1/2015 Landau ............... B01J 29/0341
210/763
10,125,072 B2 * 11/2018 Zaman ................ B01J 35/1009
(Continued)

FOREIGN PATENT DOCUMENTS

CN 1935359 3/2007
CN 103230813 8/2013
(Continued)

OTHER PUBLICATIONS

Zhan, Wangcheng et al., "Synthesis of Mesoporous CeO2—MnOx Binary Oxides and Their Catalytic Performances for CO Oxidation", *Journal of Rare Earths*, vol. 32, No. (2), Feb. 28, 2014 (Feb. 28, 2014).
(Continued)

*Primary Examiner* — Cam N. Nguyen
(74) *Attorney, Agent, or Firm* — Workman Nydegger

(57) ABSTRACT

A cerium manganese catalyst for ozone decomposition, which is mainly a composite oxide of $Mn_2O_3$ and $CeO_2$ with the chemical constitution of $CeMn_aO_x$, a being a natural number selected from 6 to 15. A method for preparing a
(Continued)

catalyst comprises: mixing a solution containing a cerium source and a manganese source with excessive urea, reacting to obtain a precipitate, washing the precipitate to neutral, drying, and roasting to obtain the cerium manganese catalyst.

16 Claims, 2 Drawing Sheets

(51) Int. Cl.
　　*B01J 23/656*　　(2006.01)
　　*B01J 35/00*　　(2006.01)
　　*B01J 37/03*　　(2006.01)
　　*B01J 37/06*　　(2006.01)
(58) Field of Classification Search
　　USPC .................................................. 502/304, 324
　　See application file for complete search history.

(56) References Cited

U.S. PATENT DOCUMENTS

| | | | | |
|---|---|---|---|---|
| 10,252,248 | B2* | 4/2019 | Izumi | B01J 37/08 |
| 2012/0067830 | A1* | 3/2012 | Alarco | B01J 23/6562 |
| | | | | 210/758 |
| 2018/0193819 | A1* | 7/2018 | Furui | B01J 35/0006 |
| 2022/0126274 | A1* | 4/2022 | Ruettinger | B01J 35/026 |

FOREIGN PATENT DOCUMENTS

| | | |
|---|---|---|
| CN | 104001502 | 8/2014 |
| CN | 107486206 | 12/2017 |
| CN | 107519861 | 12/2017 |
| CN | 108435160 | 8/2018 |
| GB | 1119180 | 7/1968 |

OTHER PUBLICATIONS

Luo, Mengfei et al., "The Properties of the Surface Oxygen on Manganese-Cerium Composite Oxide", Chemical Journal of Chinese Universities, vol. 14, No. (5), May 31, 1993 (May 31, 1993), pp. 708-710.

Ma, Jinzhu et al., "Transition Metal Doped Cryptomelane-Type Manganese Oxide Catalysts for Ozone Decomposition" *Applied Catalysis B: Environmental*, No. no. 201, Aug. 22, 2016 (Aug. 22, 2016).

Gui, Mingshan et al., "Effect of Preparation Method on MonOx—CeO2 Catalysts for NO Oxidation", *Journal of Rare Earths*, vol. 31, No. (6) Jun. 30, 2013 (Jun. 30, 2013), pp. 572-576.

Machida, Masato et al., "Solid-gas interaction of nitrogen oxide adsorbed on MNOx—CeO2:a DRIFTS study", *Journal of Materials Chemistry*, Jan. 26, 2001.

International Search Report issued in PCT/CN2019/071904 dated Apr. 3, 2019.

Chinese office Action issued in Application No. 201810234417.2, dated Feb. 26, 2020.

* cited by examiner

CERIUM MANGANESE CATALYST, PREPARATION METHOD THEREFOR AND USE THEREOF

CROSS-REFERENCE TO RELATED APPLICATIONS

This Application is a 371 of International Patent Application No. PCT/CN2019/071904, filed Jan. 16, 2019, which claims the benefit of Chinese Patent Application No. 201810234417.2, filed Mar. 21, 2018, which are incorporated by reference in their entireties.

TECHNICAL FIELD

The present application belongs to the field of catalysts, and relates to a cerium-manganese catalyst, a preparation method therefor and use thereof, for example, to a cerium-manganese catalyst for ozone decomposition at a high space velocity within a wide temperature range, a preparation method therefor and use thereof.

BACKGROUND

Ozone ($O_3$), like oxygen ($O_2$), is an allotrope of oxygen elements and has a special fishy smell and a lavender color, and is a double-edged sword for the environment for the survival of mankind. In the stratosphere, ozone protects human beings on earth from the direct exposure of harmful ultraviolet rays, but near the earth's surface, ozone would affect the skin, immune system, and nervous system of human beings to a varying degree. We must therefore pay high attention to ozone hazards.

On Oct. 1, 2015, the U.S. Environmental Protection Agency (EPA) lowered the ozone emission standard from 75 ppb to 70 ppb. China's Indoor Air Quality Standard (GB/T 18883-2002) requires that the average ozone concentration within an hour shall not exceed 160 $\mu g/m^3$ (about 82 ppb). In recent years, ozone has been widely used in various industries such as medical care and public health, food preservation and water treatment. In the course of use, ozone residue can be easily produced and then directly discharged into the atmosphere, which may cause formation of secondary particles to aggravate the haze, seriously affecting our living environment. In the meantime, in our living areas, the operation of printers, as well as the use of air cleaners and ventilation systems utilizing electrostatic dust removal technologies, can generate ozone, which has been severely threatening human health. There is therefore an urgent need for innocent disposal of ozone.

Current predominant methods of disposal of ozone include an activated carbon method, a liquid absorption method and a catalytic method. Among those, the catalytic decomposition of ozone has the advantages of safety, efficiency, economy, environmental friendliness and no need for replacement of consumables, and has become a focus of research. At present, catalysts for ozone decomposition can be classified into manganese-containing catalysts, transition metal-containing catalysts, and noble metal catalysts. However, the relevant catalysts still have such problems as high cost, poor moisture resistance and low ozone decomposition rate.

CN 104001502A discloses a cerium-manganese catalyst for decomposing ozone at room temperature in high humidity as well as a preparation method and an application thereof. The cerium-manganese catalyst includes the following chemical composition: $CeMn_aO_x$, where a is a natural number from 1 to 8. The method includes the following steps: (1) dissolving a divalent manganese source into deionized water, sufficiently stirring till the divalent manganese source is completely dissolved, and subsequently adjusting the pH value to be 4 to 5; (2) adding a cerium source into the solution obtained in the step (1), sufficiently stirring till the solid is completely dissolved, then slowly dropping a potassium permanganate solution, stirring, and subsequently moving the solution into a high pressure hydrothermal kettle, and performing hydrothermal reaction for 24 hours at 100° C.; and (3) cooling, performing centrifugal washing, and drying, thereby obtaining the cerium-manganese catalyst for decomposing ozone at room temperature in high humidity. The cerium-manganese catalyst shows relatively high ozone catalytic decomposition activity when the relative humidity is 90%, and can be applied to ozone decomposition at room temperature in high humidity. CN 107519861A discloses a cerium-manganese composite oxide catalyst as well as a preparation method and application thereof. Chemical composition of the cerium-manganese composite oxide catalyst is as follows: $CeMn_aO_x$, where the valence state of Mn is mainly valence 4 and the value of a is selected from natural numbers between 10 to 25. The preparation method of the catalyst includes the following steps: (1) mixing ammonium persulfate with a solution containing a cerium source and a bivalent manganese source and completely dissolving to obtain a reaction solution; (2) carrying out hydrothermal reaction on the reaction solution; carrying out post treatment on a reaction product to obtain a solid product; and (3) roasting the solid product to obtain the cerium-manganese composite oxide catalyst. However, the preparation of the two catalysts requires hydrothermal conditions, which is linked to high energy consumption and complex processes. In addition, the obtained catalysts, when used for catalytic decomposition of ozone, require relatively strict temperature conditions and show imperfect long-term effect of ozone decomposition, and therefore require further optimization.

SUMMARY

The following is a summary of the subject matter described herein in detail. This summary is not intended to limit the scope of the claims.

The object of the present application is to provide a cerium-manganese catalyst for ozone decomposition at a high space velocity within a wide temperature range, a preparation method therefor and use thereof. The method for preparing a catalyst is simple and convenient and has a short process. The catalyst, applicable to conditions of a wide temperature range and a high space velocity and to a wide humidity range, allows efficient decomposition of various gases containing ozone for a long time, and shows promise to be applied to the outer surface of buildings or a radiator of a motor vehicle and the like to solve the problem of ozone pollution in the atmosphere, as well as to a high-altitude aircraft to solve the problem of ozone pollution.

The wide temperature range and the high space velocity in the present application refer to a temperature range of −10° C. to 100° C. and a space velocity of not less than 600,000 $h^{-1}$ respectively.

The condition of wide humidity range refers to a humidity of not more than 90%.

To achieve the object, the present application adopts technical solutions described below.

A first object of the present application is to provide a cerium-manganese catalyst. The cerium-manganese catalyst has the following chemical composition: $CeMn_aO_x$, where a value of a in $CeMn_aO_x$ is a natural number selected from 6 to 15, such as 6, 7, 8, 9, 10, 11, 12, 13, 14 or 15. The cerium-manganese catalyst is mainly a composite oxide of $Mn_2O_3$ and $CeO_2$.

$CeO_2$ can be detected in the cerium-manganese catalyst provided by the present application through X ray diffraction (XRD), which is mainly a composite oxide of $Mn_2O_3$ and $CeO_2$, while the catalyst disclosed by CN 104001502A is mainly a Ce-doped OMS-2 (a $\alpha$-$MnO_2$) structure, and the catalyst disclosed by CN 107519861A is mainly Ce-doped $\gamma$-$MnO_2$, and $CeO_2$ is undetectable in both catalysts disclosed in CN 104001502A and CN 107519861A.

When the value of a is within the above range, the cerium-manganese catalyst presents a good effect of catalyzing ozone decomposition.

The cerium-manganese catalyst allows efficient ozone decomposition for a long time under the conditions of a temperature range of $-10°$ C. to $100°$ C., a humidity below 90% and a high space velocity (a space velocity up to 2000,000 $h^{-1}$), with a decomposition efficiency above 80%.

The morphology of the cerium-manganese catalyst is granular.

A second object of the present application is to provide a method for preparing a cerium-manganese catalyst. The preparation method includes: mixing a solution containing a cerium source and a manganese source with excess urea, carrying out a reaction to obtain a precipitate, washing the precipitate to a neutral pH, drying, and calcining to obtain the cerium-manganese catalyst.

The excess urea refers to that the urea is added in an amount not less than that required for precipitating the cerium source and the manganese source.

The cerium-manganese catalyst obtained by the above preparation method allows efficient ozone decomposition for a long time under the conditions of a temperature range of $-10°$ C. to $100°$ C., a humidity below 90% and a high space velocity (a space velocity up to 2000,000 $h^{-1}$), with a decomposition efficiency above 80%. The morphology of the cerium-manganese catalyst is granular. The cerium-manganese catalyst has the following chemical composition: $CeMn_aO_x$, where the value of a in $CeMn_aO_x$ is a natural number selected from 6 to 15, or may be other numerical values. The cerium-manganese catalyst is mainly a composite oxide of $Mn_2O_3$ and $CeO_2$.

The method for preparing the cerium-manganese catalyst provided by the present application uses urea as a precipitating agent, and dispenses with pH adjustment of the solution or any special treatment, and makes it possible to prepare the required catalyst through simple mixing, which greatly simplifies the preparation process. In case the urea is replaced with any other precipitating agents, the above cerium-manganese catalyst with such catalytic activity cannot be obtained.

The cerium source is selected from one or a mixture of at least two of cerium nitrate, cerium sulfate, cerium acetate or cerium chloride, and a typical but non-limiting combination, for example, is a combination of cerium nitrate and cerium sulfate, a combination of cerium nitrate and cerium acetate, or a combination of cerium sulfate, cerium acetate and cerium chloride.

Optionally, a concentration of the cerium source is 0.01 to 0.05 mol/L, for example, 0.02 mol/L, 0.03 mol/L, 0.04 mol/L, etc.

Optionally, the manganese source is selected from one or a mixture of at least two of manganese nitrate, manganese sulfate, manganese acetate or manganese chloride, and a typical but non-limiting combination, for example, is a combination of manganese nitrate and manganese sulfate, a combination of manganese acetate and manganese chloride, a combination of manganese nitrate, manganese sulfate and manganese acetate, or a combination of manganese sulfate, manganese acetate or manganese chloride.

Optionally, a concentration of the manganese source is 0.1 to 0.5 mol/L, for example, 0.1 mol/L, 0.2 mol/L, 0.3 mol/L, 0.4 mol/L etc.

Optionally, a molar ratio of cerium in the cerium source to manganese in the manganese source is 1:(6-15), for example, 1:7, 1:8, 1:9, 1:10, 1:11, 1:12, 1:13, 1:14, 1:15, etc. When the molar ratio is within the above range, the catalytic activity of the prepared cerium-manganese catalyst is relatively high.

Optionally, a solid-to-liquid ratio of the urea to the solution containing the cerium source and the manganese source is 0.15 to 0.3 g/L, for example, 0.18 g/L, 0.19 g/L, 0.23 g/L, 0.25 g/L, 0.27 g/L, etc.

Optionally, a temperature for the reaction is $60°$ C. to $100°$ C., for example, $62°$ C., $65°$ C., $68°$ C., $73°$ C., $78°$ C., $85°$ C., $89°$ C., $91°$ C., $96°$ C., etc. The urea is uniformly hydrolyzed at said reaction temperature, facilitating the uniform precipitation of cerium and manganese.

Optionally, a period for the reaction is 8 to 24 hours (h), for example, 8.5 h, 9.2 h, 12.0 h, 15.0 h, 18.6 h, 22.3 h, 23.5 h, etc.

Optionally, the reaction comprises stirring at a speed of 400 to 800 r/min, and for example, the stirring speed is 450 r/min, 500 r/min, 600 r/min, 750 r/min, 780 r/min, etc.

The precipitate is washed with water to a neutral pH to remove the impact of residual ions.

Optionally, a temperature for the drying is $90°$ C. to $150°$ C., for example, $95°$ C., $98°$ C., $105°$ C., $108°$ C., $112°$ C., $116°$ C., $119°$ C., $123°$ C., $128°$ C., $136°$ C., $145°$ C., $148°$ C., etc.

Optionally, a period for the drying is 8 to 24 h, for example, 9 h, 10 h, 12 h, 16 h, 18 h, 22 h, etc.

A temperature for the calcining is $300°$ C. to $700°$ C., for example, $315°$ C., $336°$ C., $348°$ C., $359°$ C., $367°$ C., $375°$ C., $389°$ C., $394°$ C., $405°$ C., $423°$ C., $458°$ C., $473°$ C., $496°$ C., $520°$ C., $536°$ C., $549°$ C., $558°$ C., $569°$ C., $584°$ C., $623°$ C., $658°$ C., $685°$ C., etc.

Optionally, a period for the calcining is 1.5 to 5 h, for example, 2 h, 2.5 h, 3 h, 3.5 h, 4 h, 4.5 h, etc.

As an optional technical solution, the method for preparing the cerium-manganese catalyst provided by the present application includes: mixing a solution containing a cerium source and a manganese source with urea, where a concentration of the cerium source and a concentration of the manganese source in the solution containing the cerium source and the manganese source are 0.01 to 0.05 mol/L and 0.1 to 0.5 mol/L respectively, and a solid-to-liquid ratio of the urea to the solution containing the cerium source and the manganese source is optionally 0.15 to 0.3 g/L; stirring an obtained mixture at a speed of 400 to 800 r/min for 8 to 24 h at $60°$ C. to $100°$ C. to obtain a precipitate; and washing the precipitate with water to a neutral pH, drying the washed precipitate at $90°$ C. to $150°$ C. for 8 to 24 h, and calcining the dried precipitate at $300°$ C. to $700°$ C. for 1.5 to 5 h to obtain the cerium-manganese catalyst.

The cerium-manganese catalyst with excellent performances can be prepared by uniform precipitation. The preparation method is simple and convenient, with a short process flow and low cost.

A third object of the present application is to provide use of the cerium-manganese catalyst described above as a catalyst for ozone decomposition. The cerium-manganese catalyst is suitable for use under the conditions of a wide temperature range (a temperature range of −10° C. to 100° C.) and a high space velocity (a high space velocity up to 2000,000 h$^{-1}$), and has its activity maintained for a long time. The cerium-manganese catalyst can be applied to processing various gases containing ozone, and shows promise to be applied to the outer surface of buildings or a radiator of a motor vehicle and the like to solve the problem of ozone pollution in the atmosphere, as well as to a high-altitude aircraft to solve the problem of ozone pollution.

Any numerical range described in the present application includes not only the above-exemplified point values but also any point values within the numerical range which are not exemplified. Due to space limitations and for the sake simplicity, the present application is not exhaustive of specific point values included in the range.

Compared with the related art, the present application has the following beneficial effects.

The cerium-manganese catalyst provided by the present application is applicable to the conditions of a wide temperature range (a temperature range of −10° C. to 100° C.), a wide humidity range (a humidity being below 90%) and a high space velocity (a high space velocity up to 2000,000 h$^{-1}$), and after 70 hours of use, the cerium-manganese catalyst still give an efficient decomposition rate of 99% of ozone of 4 ppm.

The method for preparing the cerium-manganese catalyst provided by the present application is so simple and convenient that the cerium-manganese catalyst can simply be prepared by the co-precipitation method. In addition, the method has a short process flow.

The cerium-manganese catalyst provided by the present application can be applied to processing various gases containing ozone, and shows promise to be applied to the outer surface of buildings or a radiator of a motor vehicle and the like to solve the problem of ozone pollution in the atmosphere, as well as to a high-altitude aircraft to solve the problem of ozone pollution.

Other aspects may become apparent upon reading and understanding the detailed description and the drawings.

DETAILED DESCRIPTION

Figure 1:
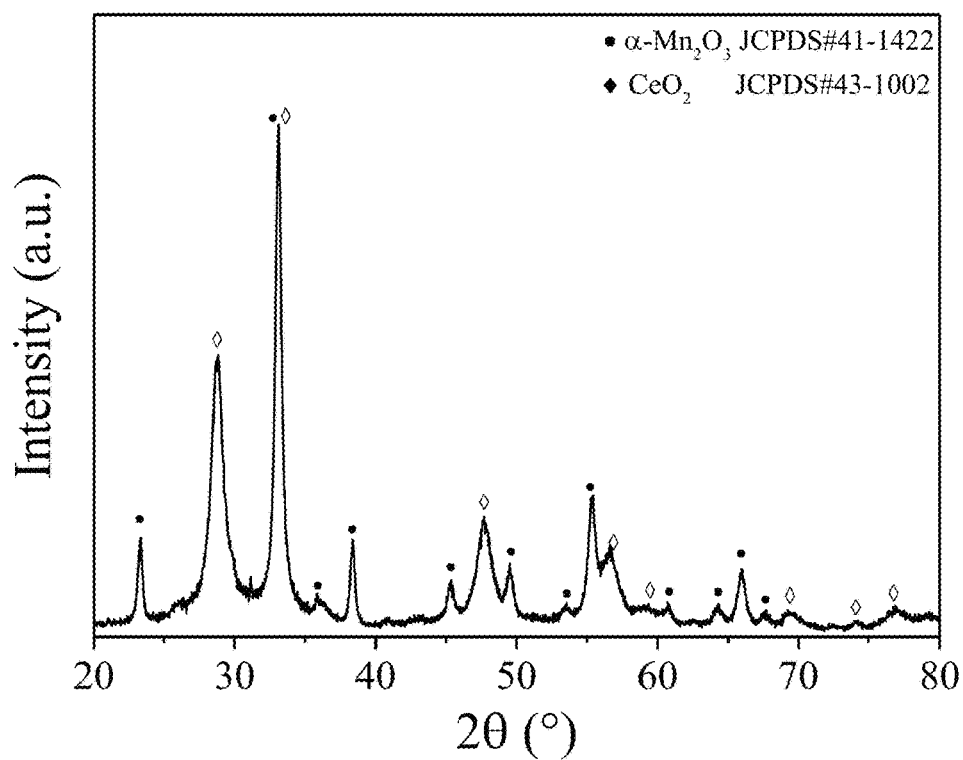
FIG. 1 is an XRD pattern of a cerium-manganese catalyst provided by Example 3.
Figure 2:
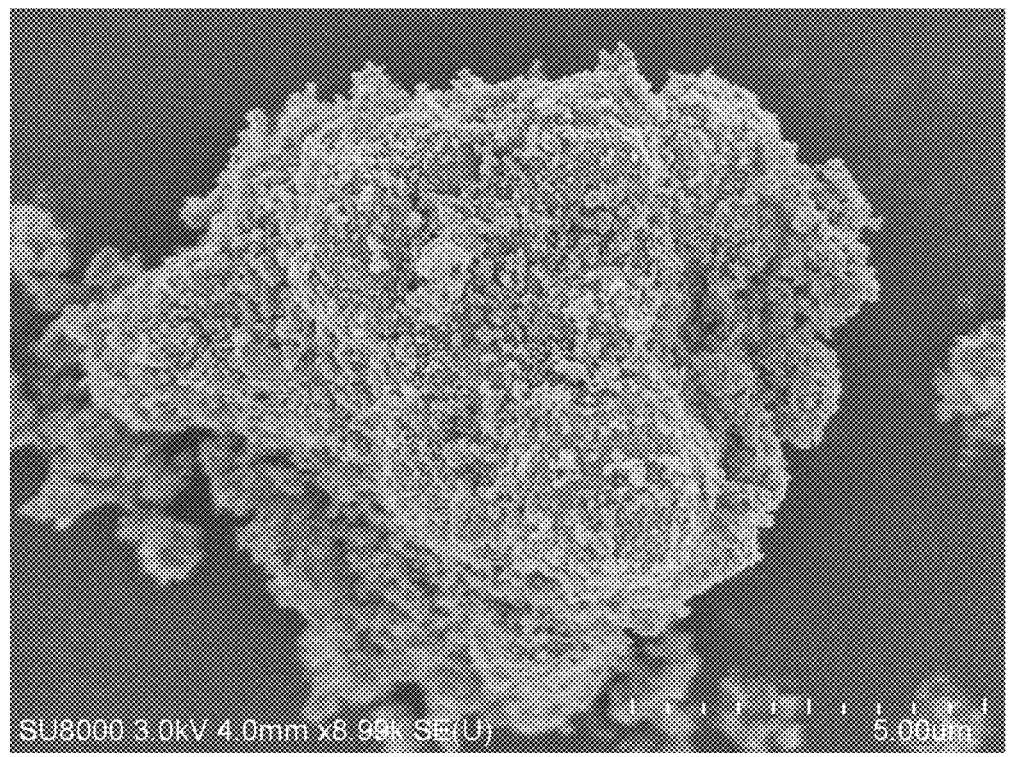
FIG. 2 is an SEM picture of the cerium-manganese catalyst provided by Example 3.
Figure 3:
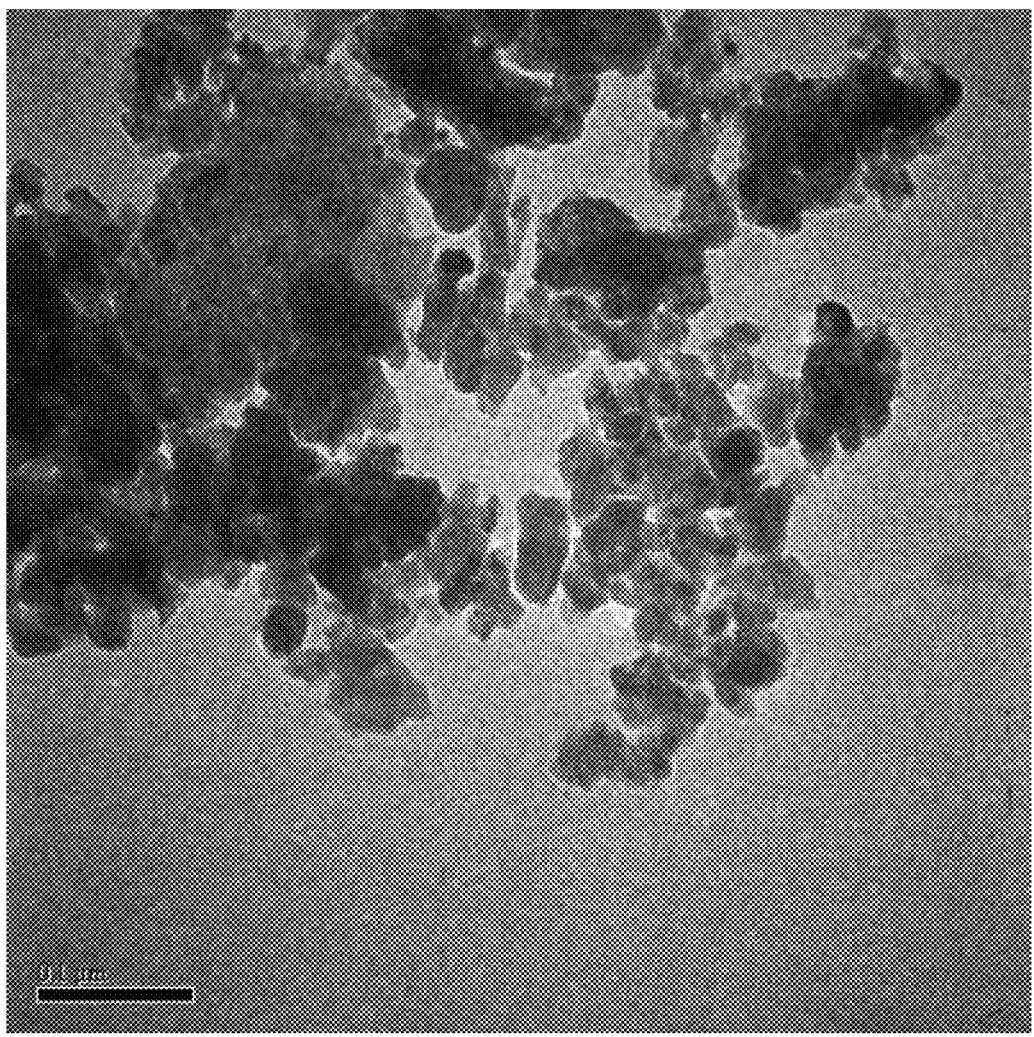
FIG. 3 is a TEM picture of the cerium-manganese catalyst provided by Example 3, where the scale dimension represents 0.1 μm.

Technical solutions of the present application are further described below through specific implementations in conjunction with the drawings.

EXAMPLE 1

A method for preparing a cerium-manganese catalyst:

A solution containing a cerium source (cerium nitrate) and a manganese source (manganese nitrate) (a molar ratio of Ce:Mn=1:6) was mixed with excess urea, where a concentration of the cerium source and a concentration of the manganese source in the solution containing the cerium source and the manganese source were 0.03 mol/L and 0.18 mol/L respectively, and a solid-to-liquid ratio of the urea to the solution containing the cerium source and the manganese source was 0.20 g/L. An obtained mixture was stirred for 12 h at 80° C. to obtain a precipitate. The precipitate was washed with water to a neutral pH, the washed precipitate was dried at 120° C., and the dried precipitate was calcined at 600° C. to obtain the cerium-manganese catalyst, marked as $CeMn_6O_x$-600.

EXAMPLE 2

A method for preparing the cerium-manganese catalyst as in Example 1, except that the molar ratio of Ce:Mn was 1:8. The resultant cerium-manganese catalyst was marked as $CeMn_8O_x$-600.

EXAMPLE 3

A method for preparing the cerium-manganese catalyst as in Example 1, except that the molar ratio of Ce:Mn was 1:10. The resultant cerium manganese catalyst was marked as $CeMn_{10}O_x$-600.

EXAMPLE 4

A method for preparing the cerium-manganese catalyst as in Example 1, except that the molar ratio of Ce:Mn was 1:15. The resultant cerium-manganese catalyst was marked as $CeMn_{15}O_x$-600.

EXAMPLE 5

A method for preparing the cerium-manganese catalyst as in Example 3, except that the calcining temperature was 300° C. The resultant cerium-manganese catalyst was marked as $CeMn_{10}O_x$-300.

EXAMPLE 6

A method for preparing the cerium-manganese catalyst as in Example 3, except that the calcining temperature was 400° C. The resultant cerium-manganese catalyst was marked as $CeMn_{10}O_x$-400.

EXAMPLE 7

A method for preparing the cerium-manganese catalyst as in Example 3, except that the calcining temperature was 500° C. The resultant cerium-manganese catalyst was marked as $CeMn_{10}O_x$-500.

EXAMPLE 8

A method for preparing the cerium-manganese catalyst as in Example 3, except that the calcining temperature was 700° C. The resultant cerium-manganese catalyst was marked as $CeMn_{10}O_x$-700.

The catalysts obtained in Examples 1 to 8 were subjected to the performance test, and the specific test conditions and test results are shown in Table 1 below.

TABLE 1

| No. | Catalyst | Ozone concentration (ppm) | Temperature (° C.) | Relative humidity | space velocity ($h^{-1}$) | $O_3$ conversion rate |
|---|---|---|---|---|---|---|
| 1 | $CeMn_6O_x$-600 | 40 | 30 | 65% | 600,000 | 98% |
| 2 | $CeMn_8O_x$-600 | 40 | 35 | 70% | 600,000 | 98% |
| 3 | $CeMn_{10}O_x$-600 | 40 | 30 | 65% | 800,000 | 99.5% |
| 4 | $CeMn_{15}O_x$-600 | 40 | 35 | 90% | 600,000 | 99% |
| 5 | $CeMn_{10}O_x$-300 | 40 | 50 | 60% | 700,000 | 80% |
| 6 | $CeMn_{10}O_x$-400 | 10 | 50 | 50% | 700,000 | 80% |
| 7 | $CeMn_{10}O_x$-500 | 20 | 30 | 70% | 700,000 | 99% |
| 8 | $CeMn_{10}O_x$-700 | 30 | 30 | 70% | 700,000 | 85% |
| 9 | $CeMn_8O_x$-600 | 40 | 30 | 65% | 1000,000 | 90% |
| 10 | $CeMn_{10}O_x$-600 | 40 | 50 | 65% | 1000,000 | 95% |
| 11 | $CeMn_{15}O_x$-600 | 40 | 100 | 65% | 1000,000 | 100% |
| 12 | $CeMn_{10}O_x$-600 | 4 | −10 | <20% | 2000,000 | 99% |
| 13 | $CeMn_{10}O_x$-600 | 0.1 | 0 | 60% | 2000,000 | 99% |

It can be seen that the cerium-manganese catalyst can efficiently decompose ozone in the conditions of a wide temperature range and high space velocity, where the temperature range can be scaled to −10° C. to 100° C., the space velocity can be up to 2000,000 $h^{-1}$, and the humidity range can be scaled to below 90%, and the ozone decomposition rate is not less than 80%, up to 100%; in addition, the test shows that the catalytic activity of the catalyst can be maintained for more than 70 hours (the catalyst still gives a decomposition rate of 99% of ozone of 4ppm after 70 h of use).

Furthermore, once any one or a combination of at least two of the reaction temperature, stirring period or drying temperature in the preparation method described in Example 3 was adjusted such that the reaction temperature became 60° C., 65° C., 72° C., 84° C. or 100° C., the stirring period became 8 h, 8.5 h, 9.5 h, 10.2 h, 15.6 h, 20.0 h h or 24.0 h, and the drying temperature became 90° C., 95° C., 100° C., 105° C., 110° C., 125° C., 130° C., 145° C. or 150° C., the prepared cerium-manganese catalyst allows efficient ozone decomposition under the conditions of wide temperature range and high space velocity, where the temperature range can be scaled to −10° C. to 100° C., the space velocity can be up to 2000,000 $h^{-1}$, and the humidity range can be scaled to below 90%, and the ozone decomposition rate is not less than 80%, up to 99%; in addition, the test shows that the catalytic activity of the catalyst can be maintained for more than 70 hours (the catalyst still gives a decomposition rate of 99% of ozone of 4ppm after 70 h of use).

In case the concentrations of the cerium source and the manganese source, the molar ratio of the cerium source and the manganese source, and the amount of the urea added (always in excess) in the preparation method described in Example 3 were adjusted such that the concentration of the cerium source was any value between 0.01 and 0.05 mol/L, such as 0.02 mol/L, 0.03 mol/L, 0.04 mol/L, etc., that the concentration of the manganese source was any value between 0.1 and 0.5 mol/L, such as 0.1 mol/L, 0.02 mol/L, 0.3 mol/L, 0.4 mol/L, etc., and that the molar ratio of cerium in the cerium source to manganese in the manganese source was any value between 1:(6-15), such as 1:7, 1:8, 1:9, 1:10, 1:11, 1:12, 1:13, 1:14, 1:15, etc., and that the solid-to-liquid ratio of the urea and the solution containing the cerium source and the manganese source was 0.15 to 0.3 g/L, such as 0.18 g/L, 0.19 g/L, 0.23 g/L, 0.25 g/L, 0.27 g/L, etc., the prepared cerium manganese catalyst allows efficient ozone decompositon under the conditions of wide temperature range and high space velocity, where the temperature range can be scaled to −10° C. to 100° C., the space velocity can be up to 2000,000 $h^{-1}$, and the humidity range can be scaled to below 90%, and the ozone decomposition rate is not less than 80%, up to 99%; in addition, the test shows that the catalytic activity of the catalyst can be maintained for more than 70 hours (the catalyst still gives a decomposition rate of 99% of ozone of 4ppm after 70 h of use).

In case the cerium source in Example 3 is replaced with one or a mixture of at least two of cerium sulfate, cerium acetate or cerium chloride, or the manganese source in Example 3 is replaced with one or a mixture of at least two of manganese sulfate, manganese acetate or manganese chloride, the performance of the obtained cerium-manganese catalyst will not be affected.

It is found after testing that in case the calcining temperature reaches above 420° C. during the preparation of a cerium-manganese catalyst, the obtained catalyst, when used for ozone decomposition under the conditions of the temperature range of −10° C. to 100° C. and the space velocity of 2000,000 $h^{-1}$, presents an ozone decomposition rate of more than 85%.

COMPARATIVE EXAMPLE 1

A method for preparing a catalyst as in Example 3, except that the urea was replaced with $Na_2CO_3$ in a same amount.

COMPARATIVE EXAMPLE 2

A method for preparing a catalyst as in Example 3, except that the urea was replaced with aqueous ammonia in a same amount.

COMPARATIVE EXAMPLE 3

A method for preparing a catalyst as in Example 3, except that the urea was replaced with NaOH in a same amount.

COMPARATIVE EXAMPLE 4

A method for preparing a catalyst as in Example 3, except that the amount of added urea was ½ of the molar quantity of urea required for fully precipitating Ce and Mn.

The catalysts obtained in Comparative examples 1 to 4 were tested for their catalytic activity according to the test conditions numbered 3, 5-8, 10, 12 and 13 in Table 1, to obtain an ozone decomposition rate of up to 60% and a minimum of 12%.

It can be seen from Comparative examples 1 to 4 that the use of urea has a great influence on the catalyst performance, and in case the urea was replaced with any other material, the above cerium manganese catalyst with excellent performance cannot be obtained.

The applicant has stated that the above are only specific embodiments of the present application and that the scope of the present application is not limited thereto.

What is claimed is:

1. A method for preparing a cerium-manganese catalyst for ozone decomposition at a high space velocity within a wide temperature range:
   mixing a solution consisting of a cerium source and a manganese source with excess urea, carrying out a reaction to obtain a precipitate, washing the precipitate to a neutral pH, drying, and calcining to obtain the cerium-manganese catalyst,
   wherein the cerium-manganese catalyst has a following chemical composition: $CeMn_aO_x$, wherein a in $CeMn_aO_x$ is a natural number selected from 9 to 15, and the cerium-manganese catalyst is mainly a composite oxide of $Mn_2O_3$ and $CeO_2$, wherein the cerium-manganese catalyst is in a form of particles, wherein when the cerium-manganese catalyst is used for ozone decomposition, a temperature range is $-10°$ C. to $100°$ C., a space velocity is up to $2,000,000$ $h^{-1}$, a humidity is not more than 90%, a decomposition efficiency is above 80%, and the cerium-manganese catalyst gives a decomposition rate of 99% of ozone of 4 ppm after 70 h of use.

2. The preparation method according to claim 1, wherein a molar ratio of cerium in the cerium source to manganese in the manganese source is 1:(6-15).

3. The preparation method according to claim 1, wherein a temperature of the reaction is $60°$ C. to $100°$ C.

4. The preparation method according to claim 1, wherein the cerium source is selected from one or a mixture of at least two of cerium nitrate, cerium sulfate, cerium acetate or cerium chloride.

5. The preparation method according to claim 1, wherein the manganese source is selected from one or a mixture of at least two of manganese nitrate, manganese sulfate, manganese acetate or manganese chloride.

6. The preparation method according to claim 1, wherein a period for the reaction is 8 to 24 hours.

7. The preparation method according to claim 1, wherein the washing the precipitate to a neutral pH is performed with water.

8. The preparation method according to claim 1, wherein a temperature for the drying is $90°$ C. to $150°$ C.

9. The preparation method according to claim 1, wherein a temperature for the calcining is $300°$ C. to $700°$ C.

10. The preparation method according to claim 1, further comprising: mixing a solution containing a cerium source and a manganese source with urea, wherein a concentration of the cerium source and a concentration of the manganese source in the solution containing the cerium source and the manganese source are 0.01 to 0.05 mol/L and 0.1 to 0.5 mol/L respectively, and a solid-to-liquid ratio of the urea to the solution containing the cerium source and the manganese source is 0.15 to 0.3 g/L; stirring an obtained mixture at a speed of 400 to 800 r/min for 8 to 24 hours at $60°$ C. to $100°$ C. to obtain a precipitate; and washing the precipitate with water to a neutral pH, drying the washed precipitate at $90°$ C. to $150°$ C. for 8 to 24 hours, and calcining the dried precipitate at $300°$ C. to $700°$ C. for 1.5 to 5 hours to obtain the cerium-manganese catalyst.

11. The preparation method according to claim 1, wherein a concentration of the cerium source is 0.01 to 0.05 mol/L.

12. The preparation method according to claim 1, wherein a concentration of the manganese source is 0.1 to 0.5 mol/L.

13. The preparation method according to claim 1, wherein a solid-to-liquid ratio of the urea to the solution containing the cerium source and the manganese source is 0.15 to 0.3 g/L.

14. The preparation method according to claim 1, wherein the reaction comprises stirring at a speed of 400 to 800 r/min.

15. The preparation method according to claim 1, wherein a period for the drying is 8 to 24 hours.

16. The preparation method according to claim 1, wherein a period for the calcining is 1.5 to 5 hours.

* * * * *